US009910292B2

(12) United States Patent
Tirindelli

(10) Patent No.: US 9,910,292 B2
(45) Date of Patent: Mar. 6, 2018

(54) METHOD FOR MAKING ARMS FOR SPECTACLES FROM COMPOSITE MATERIAL WITH DIFFERENTIATED RIGIDITY AND ARMS FOR SPECTACLES OBTAINED THEREBY

(71) Applicant: OPTIMAE S.R.L., Susegana (TV) (IT)

(72) Inventor: Giovanna Tirindelli, San Polo di Piave (IT)

(73) Assignee: OPTIMAE S.R.L., Susegana (TV) (IT)

( * ) Notice: Subject to any disclaimer, the term of this patent is extended or adjusted under 35 U.S.C. 154(b) by 10 days.

(21) Appl. No.: 14/915,356

(22) PCT Filed: Aug. 28, 2014

(86) PCT No.: PCT/IB2014/064122
§ 371 (c)(1),
(2) Date: Feb. 29, 2016

(87) PCT Pub. No.: WO2015/028965
PCT Pub. Date: Mar. 5, 2015

(65) Prior Publication Data
US 2016/0216532 A1   Jul. 28, 2016

(30) Foreign Application Priority Data

Sep. 2, 2013  (IT) .............................. PD2013A0240

(51) Int. Cl.
*G02C 5/16*       (2006.01)
*G02C 5/00*       (2006.01)
(Continued)

(52) U.S. Cl.
CPC .............. *G02C 5/008* (2013.01); *B29C 70/70* (2013.01); *B29D 12/02* (2013.01); *G02C 5/18* (2013.01);
(Continued)

(58) Field of Classification Search
CPC . G02C 5/143; G02C 1/00; G02C 5/14; G02C 2200/14; G02C 5/008; G02C 5/2254
(Continued)

(56) References Cited

U.S. PATENT DOCUMENTS

| 6,117,376 A | 9/2000 | Merkel |
| 2009/0161063 A1* | 6/2009 | Parent ...................... G02C 5/18 351/114 |

FOREIGN PATENT DOCUMENTS

| EP | 0502796 | 9/1992 |
| EP | 2051128 | 4/2009 |

(Continued)

OTHER PUBLICATIONS

International Search Report dated Dec. 2, 2014 from International Application No. PCT/IB2014/064122.

*Primary Examiner* — Hung Dang
(74) *Attorney, Agent, or Firm* — Stradley Ronon Stevens & Young, LLP

(57) ABSTRACT

A method for making spectacle arms from composite material with differentiated rigidity, the arms defining a first portion and an adjacent second portion which is less rigid than the first portion. The method includes: providing a first layer of non-cross-linked fiber-reinforced polymer material in the first and second portions; providing a separating element in the first portion, and superimposing a second layer of non-cross-linked fiber-reinforced polymer material on the first layer so as to cover the separating element at the first portion and contact the first layer at the second portion; subjecting the first layer, the second layer, and the separating element interposed between them to a molding process at predetermined pressure and temperature levels so as to cross-link the polymer of the composite material, thus obtaining a thickness and rigidity of the arm at the first portion which are greater than the thickness and rigidity at the second portion.

24 Claims, 1 Drawing Sheet

(51) Int. Cl.
  *B29C 70/70* (2006.01)
  *G02C 5/18* (2006.01)
  *B29D 12/02* (2006.01)
  *B29L 12/00* (2006.01)
  *B29K 101/10* (2006.01)
  *B29K 105/08* (2006.01)
  *B29K 307/04* (2006.01)
  *B29K 675/00* (2006.01)

(52) U.S. Cl.
  CPC .. *B29K 2101/10* (2013.01); *B29K 2105/0881* (2013.01); *B29K 2307/04* (2013.01); *B29K 2675/00* (2013.01); *B29K 2715/003* (2013.01); *B29L 2012/005* (2013.01); *G02C 2200/14* (2013.01)

(58) Field of Classification Search
  USPC ................ 351/41, 111, 114, 117, 158; 29/20
  See application file for complete search history.

(56) References Cited

FOREIGN PATENT DOCUMENTS

| | | |
|---|---|---|
| EP | 2581780 | 4/2013 |
| WO | 2009/080444 | 7/2009 |
| WO | 2015/028416 | 3/2015 |

\* cited by examiner

METHOD FOR MAKING ARMS FOR SPECTACLES FROM COMPOSITE MATERIAL WITH DIFFERENTIATED RIGIDITY AND ARMS FOR SPECTACLES OBTAINED THEREBY

RELATED APPLICATION

This application is a U.S. national phase application of PCT International Application No. PCT/IB2014/064122 filed on Aug. 28, 2014.

TECHNICAL FIELD

The present invention relates to a method for making arms for spectacles from composite material with differentiated rigidity. The invention also concerns an arm for spectacles obtained according to this method.

BACKGROUND

There are known arms for spectacles made of composite material formed from a polymer matrix, generally epoxide-based, reinforced with fibres, typically of carbon.

Arms of this type, described for example in International Publication No. WO 2009/080444, are particularly valued not only for their distinctive appearance but also for their mechanical characteristics and the lightness imparted to them by the material from which they are made.

This material is formed by long fibers, present in the polymer matrix in a high percentage by weight of at least 50% and possibly as much as 70%, which can be processed so as to be substantially unidirectional, or so as to be intertwined or woven, embedded in a polymer matrix to form a layer of pre-impregnated material, also known as "pre-preg."

It should be noted that these composite materials are clearly different, in terms of both their production and their mechanical characteristics, from composite materials comprising a polymer matrix in which reinforcing fibers of reduced length (known as "short fibers") are embedded in proportions of up to 40% by weight, these fibers generally being dispersed in a random way in the matrix.

Arms of the aforementioned type are generally made by successively superimposing a suitable number of these layers, which are subjected, within a suitable mold, to temperature and pressure conditions which result in a process of consolidation and cross-linking of the composite material forming the superimposed layers. On completion of the cross-linking phase of the composite material, a sheet-like intermediate product is obtained, from which the arms are produced by appropriate cutting and edge trimming.

The resulting arms have substantially uniform mechanical properties along their longitudinal extension, particularly in terms of flexibility, elasticity and percentage elongation.

EP 2051128 describes an arm for spectacles made of composite material and capable of retaining over time the form imparted by manual deformation carried out to adjust the shape of the arm. The arm described in EP 2051128 has this advantageous characteristic because of the provision of a metallic core of constant thickness in the arm, surrounded by a coating of fiber-reinforced polymer-based composite material. The metallic core extends from a first longitudinal end of the arm, where it can act as a hinge element with the front frame, to the opposite longitudinal end. The arm described in EP 2051128 has a substantially constant thickness along the longitudinal extension of the arm, at least in its regions made of composite material.

The inventor has observed that, in some cases, spectacle arms should be provided with characteristics of flexural rigidity that are suitably differentiated along their longitudinal extension, in order to meet all the aesthetic and functional requirements of designers.

For example, in order to enable the spectacles to be worn comfortably and to be kept in a position adhering to the user's head, the arm preferably has regions of differentiated flexibility, with greater flexibility in the region near the hinge (so as to replace, possibly, the conventional but costly elastic hinges), followed by a greater flexural rigidity in the median region corresponding approximately to the temple of the user wearing the spectacles. Alternatively, or additionally, it may be preferable to have an arm with a more flexible region in the area above the ear and a more rigid adjacent region in the area behind the ear, allowing the spectacles to "grip" the user's head more effectively.

The inventor has also observed that this differentiation in the rigidity characteristics is obtained in spectacle arms made of other types of material, for example metal or polymer, by providing regions of increased thickness (thickening) in the regions where greater flexural rigidity is desired.

However, the specific composition and layered structure of the composite material used is unsuitable for creating variations of thickness.

This is because, in order to keep the mechanical and aesthetic characteristics of the composite material unaltered, the ratio between the polymer and the reinforcing fibers must be kept within a well-defined range in every portion of the arm. This characteristic makes it inherently impossible to form regions of greater thickness in a structure of simple superimposed layers by shaping the mold cavity in a suitable way (for example, by forming a recess with cavities of different depth). In fact, it has been observed that, in the first phase of molding, owing to the high temperature and the newly initiated cross-linking reaction, the polymer matrix becomes particularly fluid and tends to flow from regions of higher pressure towards regions of lower pressure. Consequently, if the mold impression has varying cross sections, the greater space available in the areas of larger cross section is substantially occupied by the polymer component, so that a composite material having a high percentage of polymer is produced in these regions, whereas, in the adjacent regions, a composite material with an excessively high percentage of fibers is obtained.

To avoid such kind of drawbacks, variations of thickness are usually created by superimposing successive portions of layers in the areas concerned, with progressively reduced sizes if necessary, so that, when placed in the mold, the various areas of the layered structure are substantially subjected to the same pressure and there is no significant displacement of polymer within the material.

This operation has the drawback of requiring a considerable labor load in terms of time and human resources. Moreover, in this type of arm the edge, which is formed by the trimmed edges of the layers forming the arm, does not have the typical aesthetic effect of the texture of composite carbon materials (known as the "carbon look"), which is visible only on the principal surfaces of the layers. Although this limitation is less significant in very limited thicknesses, it may negatively affect the arm at the regions of greater thickness and may be aesthetically displeasing.

It should be noted that, in the context of the present description and the subsequent claims, the term "rigidity" or "flexural rigidity" denotes the resistance of the arm or a region thereof to bending about an axis perpendicular to the longitudinal direction of the arm and substantially parallel to an axis about which the arm is hinged to a front frame of the spectacles to which the arm is intended to be fixed in a hinged arrangement. Similarly, in the context of the present description and the subsequent claims, the contrary term "flexibility" denotes the capacity of the arm or a region thereof to be deformed when subjected to bending of the same type.

SUMMARY OF THE INVENTION

The problem underlying the present invention is that of providing a method for producing arms for spectacles from composite material with differentiated rigidity, as well as an arm for spectacles which is structurally and functionally designed to overcome the limitations described above with reference to the known references.

This problem is resolved and these objects are achieved by the present invention by providing a method of production and an arm for spectacles obtained pursuant to that method.

The method for making arms for spectacles from composite material with differentiated rigidity, according to the present invention, yields an arm having the following features: a predominant longitudinal direction; at least a first portion of the arm; and at least a second portion of the arm, adjacent to the first portion along the longitudinal direction and having lower flexural rigidity than the first portion. The method comprises the following steps. First, providing at least a first layer of non-cross-linked fiber-reinforced polymer material, the at least one first layer extending along the predominant longitudinal direction at least at the first and second portions. Second, providing a separating element at the first portion. Third, superimposing at least a second layer of non-cross-linked fiber-reinforced polymer material on the at least one first layer, the second layer extending along the predominant longitudinal direction so as to cover the separating element at the at least one first portion and so as to be in contact with the at least one first layer at the at least one second portion. Finally, the method comprises subjecting the at least one first layer, the at least one second layer and the separating element interposed between them to a molding process at predetermined pressure and temperature levels so as to cross-link the polymer of the composite material, thus obtaining a thickness and rigidity of the arm at the first portion which are greater than the thickness and rigidity of the arm at the second portion.

The arm for spectacles made according to the method of the present invention has a predominant longitudinal direction; at least a first portion; and at least a second portion adjacent to the first portion along the longitudinal direction and having lower flexural rigidity than the first portion. The arm has at least a first layer of fiber-reinforced polymer material extending along the predominant longitudinal direction at least at the first and second portions. The arm further has at least a second layer of fiber-reinforced polymer material extending along the predominant longitudinal direction and superimposed on the at least one first layer so as to be in contact with the at least one first layer at the at least one second portion. At the at least one first portion, the at least one first layer and the at least one second layer of the arm are spaced apart from each other so as to obtain a thickness and rigidity of the arm at the first portion which are greater than the thickness and rigidity of the arm at the second portion.

It is to be understood that both the foregoing general description and the following detailed description are exemplary, but are not restrictive, of the invention.

BRIEF DESCRIPTION OF THE DRAWINGS

The characteristics and advantages of the invention will be made clearer by the following detailed description of preferred embodiments thereof, illustrated, for the purpose of guidance and in a non-limiting way, with reference to the attached drawings, in which.

PREFERRED EMBODIMENTS OF THE INVENTION

Figure 1:
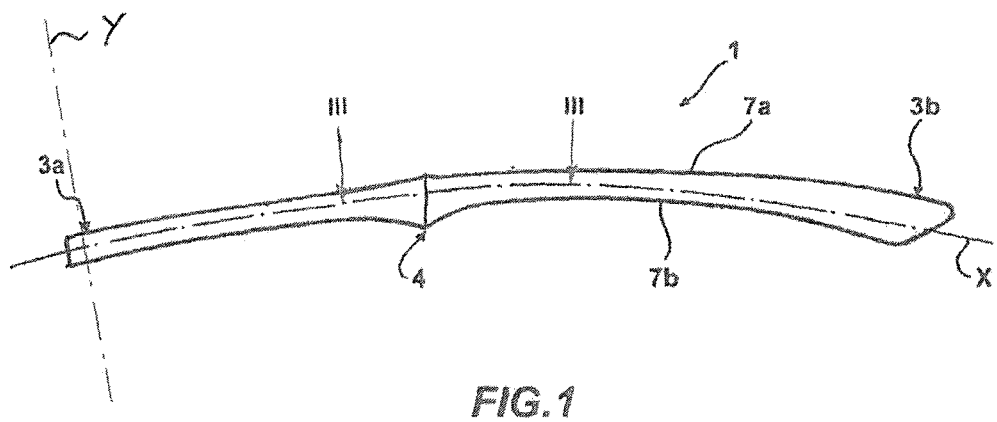
FIG. 1 is a view in side elevation of an arm for spectacles with differentiated rigidity, obtained by a production method according to the present invention.

In the figures, Reference 1 indicates, as a whole, an arm for spectacles with differentiated rigidity obtained by a production method according to the present invention.

The arm 1 extends in a predominant longitudinal direction X, and respective longitudinally opposed end regions 3a and 3b are defined on it.

The end region 3a is intended to be connected to a front frame of the spectacles, while the opposed end region 3b, forming a terminal region of the arm 1, is intended to be supported on the user's head. The end region 3a is connected to the front frame by a suitable pivoting element, typically a hinge, to allow the arm 1 to swing relative to the front frame about a hinge axis Y, substantially perpendicular to the longitudinal axis X.

The arm 1 has a thickness, defined as the dimension perpendicular to the longitudinal direction X and to the hinge axis Y, which is variable along the longitudinal direction X.

In particular, there are defined on the an in 1 a first portion 2a, a second portion 2b longitudinally adjacent to the first portion 2a, and, preferably, a third portion 2c which is also adjacent to the first portion 2a and is positioned on the longitudinally opposite side from the second portion 2b. The first portion 2a has a greater thickness than the second and third portions 2b and 2c, and consequently the rigidity of the first portion 2a is also greater than the rigidity of the second and third portions 2b and 2c.

In a preferred embodiment, the second and third portions 2b, 2c have substantially the same thickness.

In the preferred example described and illustrated herein, the first portion 2a is formed by a median region 4 of the arm 1 which, when the spectacles are worn, is positioned substantially facing one of the user's temples, while the second and third portions 2b and 2c are formed on the longitudinally opposite sides of the first portion 2a.

The median region 4 preferably has a longitudinal extension in the range from 15 mm to 40 mm, and is positioned at about 40 mm to about 80 mm from the end of the arm 1 included in the end region 3a.

Figure 2:
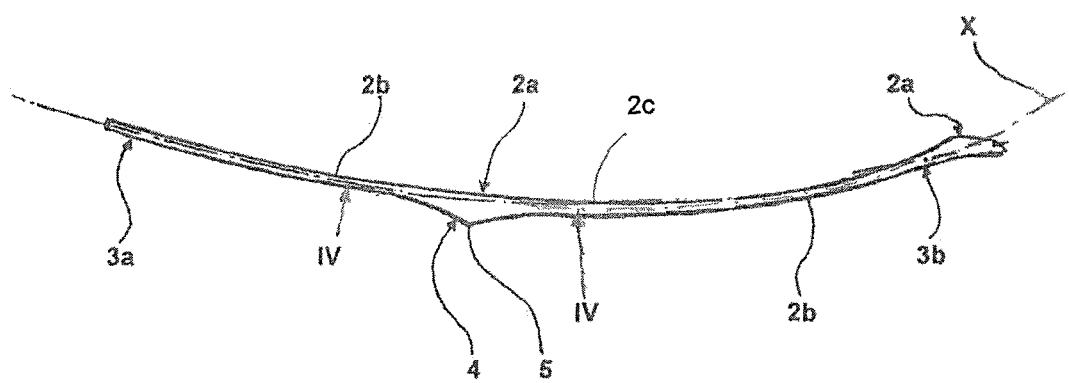
FIG. 2 is a plan view from above of the arm of FIG. 1.

In the preferred embodiment illustrated and described herein, the median region 4 has a cross section (along a plane on which the thickness of the arm 1 is measured, and which is substantially horizontal when the spectacles are worn in the normal way) of generally triangular shape (see FIGS. 2 and 3), such that the thickness of the arm 1 increases progressively from the second and third portions 2b and 2c, adjacent to the median region 4, towards a peak point 5. At this peak point 5, the thickness is preferably approximately in the range from 2 to 5 mm, while in the second and third portions 2b and 2c, adjacent to the median region 4, the thickness of the arm 1 is approximately in the range from 0.5 to 2 mm, and is preferably about 1.2 mm.

In the preferred example described and illustrated herein, the end region 3b forms a first portion 2a whose thickness and rigidity are greater than those of a region immediately adjacent to it forming the second portion 2b.

For example, the thickness of the end region 3b may be in the range from 1.5 to 4 mm, while the area of the arm 1 immediately adjacent to it may have a thickness in the range from 0.5 to 2 mm.

Clearly, the arm 1 may have regions of differentiated rigidity that differ in position, number and extension from those described in relation to the arm 1, according to the functional or aesthetic requirements that may be required. It should therefore be understood that the principles described above in relation to the first, second and third portions 2a, 2b and 2c may easily be applied to any other region of the arm.

The arm 1 is made by superimposing layers of composite material formed by a polymer matrix in which continuous reinforcing fibers are embedded, in a unidirectional or woven form, and in a percentage by weight ranging from about 50% to about 70%.

Preferably, the reinforcing fibers are woven carbon fibers embedded in a polymer matrix of the epoxide type.

However, it is also specified that the fibers may be of different types, whether inorganic, such as glass fiber or mineral fiber, or organic.

In the same way, it is also specified that the polymer matrix may be made from other thermosetting polymers, for example polymers of polyester or polyurethane basis.

As stated previously, the arm 1 is formed from a plurality of superimposed layers of composite material, and in particular it comprises at least a first layer 11 and at least a second layer 12 which are superimposed on one another so as to be in mutual contact over a large part of the surface extension of the arm 1. In particular, the first layer 11 and the second layer 12 are in mutual contact in the second portion 2b, and in the third portion 2c when present, whereas the first layer 11 is separated and spaced apart from the second layer 12 at the first portion 2a.

Preferably, the first layer 11 and the second layer 12 are in mutual contact along the entire edges 7a and 7b of the arm 1, including the edges corresponding to the first portion 2a, so that in this portion the layers 11 and 12 are in contact at the two opposed edges 7a, 7b and are separated in their internal region, as explained more fully below.

In a first embodiment of the present invention, a separating element formed by an insert 13 is interposed between the first layer 11 and the second layer 12 at the first portion (or first portions) 2a.

The insert 13 is preferably a solid body, shaped so as to determine the shape in cross section of the first portion 2a, thus defining the thickening of the arm 1 at this first portion 2a.

Figure 3:
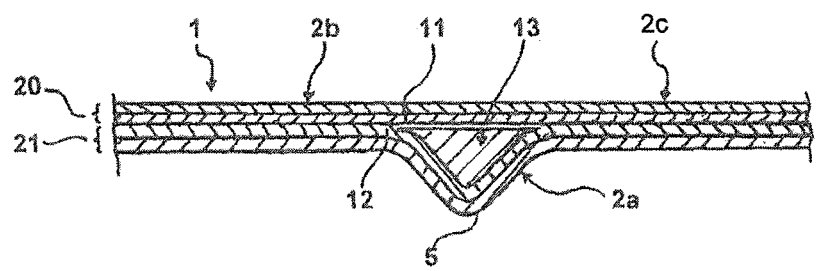
FIG. 3 is a longitudinal sectional view taken along the plane III-III of a portion of the arm of FIG. 1 shown on an enlarged scale.

The insert 13 may have any suitable shape, and, in the preferred example described herein with reference to the median region 4, it has a substantially parallelepipedal shape with a triangular cross section, the vertex of which (forming the peak point 5) faces towards the outside of the arm 1, on the opposite side from the user's head (see FIG. 3).

The insert 13 has a longitudinal dimension which is smaller than that of the first layer 11 and is approximately in the range from 15 to 40 mm, with a variable thickness which increases between the longitudinal ends and the vertex, this thickness being approximately in the range from 0.2 to 4 mm.

Figure 4:
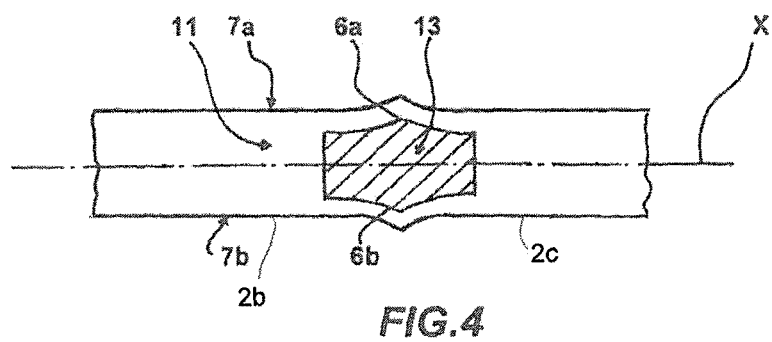
FIG. 4 is a longitudinal sectional view taken along the plane IV-IV of a portion of the arm of FIG. 2 shown on an enlarged scale.

With reference to FIG. 4, the insert 13 may have two points 6a, 6b, extending towards the upper edge 7a and the lower edge 7b of the arm 1, respectively, at its vertex. In an alternative preferred embodiment, a single point 6b, extending towards the lower edge 7b of the arm 1 is provided.

Advantageously, the dimensions of the insert 13 are also such that the first layer 11 and the second layer 12 are also in mutual contact in the first portion 2a at the upper and lower edges 7a and 7b of the arm 1.

The insert 13 can be made of any suitable material, and preferably of a material such that its shape is not substantially modified by the molding phase which the arm undergoes during processing. For example, the insert 13 may be made of metallic material, wood or medium density fiberboard (MDF) (a high-grade, composite material made from recycled wood fibers and resin), or, more preferably, of a polymer material based on thermoplastic polyurethane (TPU) which provides better attachment to the epoxy resin.

According to another aspect of the invention, the insert 13 may be made of expanded material of either closed cell or open cell type, so as to preserve the characteristics of great lightness of the arm 1. Examples of materials of this type may include polyurethane- or polyvinyl-based expanded foams or structural foams based on polymethacrylimide (PMI), available on the market under the trade name of Rohacell®.

In a second preferred embodiment of the invention, the separating element that keeps the first layer 11 and the second layer 12 apart in the first portion 2a is formed during the molding phase.

In this case, the separation between the first and the second layer 11, 12 results from an expansion action brought about by an expanding agent of the separating element, which pushes these layers against the opposed walls of a recess formed in the mold, which, at the first portion 2a, will be shaped according to the desired final shape.

In a first example of this second embodiment, the insert 13 is formed by a polymer that expands during the molding phase, forming a polymer foam. More particularly, it is possible to use a thermoplastic material, preferably a thermoplastic polyurethane (TPU), in which a suitable amount of expanding agent, such as azodicarbonamide, is dispersed, this agent evolving large amounts of gas such as nitrogen and carbon dioxide at the temperatures reached during the molding phase, thus expanding the thermoplastic material (and consequently the layers of the composite material) against the walls of the mold. The amount of expanding agent used is suitably adjusted to exert a correct pressure which does not give rise to significant displacements of polymer forming the matrix of the composite material.

In a second variant of this second embodiment, the insert 13 is formed from an amorphous polymer paste in which are dispersed microspheres (closed cells) containing a gas which, as a result of the temperature reached during the molding phase, expands and causes the volume of the microspheres to be increased up to 3 or 4 times. The polymer paste therefore expands, compressing the layers of the composite material against the walls of the mold. A material of this type suitable for use according to the procedures described above is known on the market and sold by AkzoNobel under the trade name of Expancel®. The material comprises very small spherical particles (microspheres) that consist of a plastic shell encapsulating a gas. To expand the particles, heat is added instead of air. The internal pressure from the gas increases and the shell softens. This results in a dramatic increase of the volume of the microspheres.

In a third variant of this second embodiment, the insert 13 is formed by one or more sealed bag-like envelopes containing a gas (typically air) which expands as a result of the temperature reached in the molding phase. Envelopes of this type are preferably made of thermoplastic polyurethane (TPU) filled with air and having suitable dimensions, according to the size of the first portion 2a (for example, they may have a length of several tens of millimeters with a width and thickness of several millimeters).

The first layer 11 is preferably included in a first plurality of layers, indicated as a whole by Reference 20 in FIG. 3, which are superimposed on one another on the same side of the insert 13. The layers of the first plurality 20, preferably between 2 and 4 in number, may all be made of the composite material of the first layer 11, or, in a preferred embodiment, may be made of different composite materials, so as to differentiate the characteristics of elongation and elasticity of the arm 1 in a suitable way.

For example, the first layer 11 may be formed by using a composite material based on unidirectional carbon fibers, while the outer layer, visible in the finished arm 1, may advantageously be formed by using a composite material whose reinforcing fibers are interwoven in the form of a textile. These reinforcing fibers may be carbon-based, or may be made of glass fiber which is suitably metallized (with aluminium, for example) so as to impart the desired aesthetic effect, known as "carbon look," to the arm 1.

Similarly, the second layer 12 is preferably included in a second plurality of layers, indicated as a whole by Reference 21 in FIG. 3, preferably comprising 2 to 4 layers superimposed on one another on the same side of the insert 13, opposite the first plurality of layers 20.

In this case also, the layers of the second plurality 21 may all be made of the composite material of the second layer 12, or, in a preferred embodiment, may be made of different composite materials. Additionally, the outer layer of the second plurality 21 may be identical to the outer layer of the first plurality 20, or may be different.

For example, the outer layer of the second plurality 21 may be made of carbon fiber, while the outer layer of the first plurality 20 may be made of metallized glass fiber, so as to provide an arm 1 having an inner surface (in the sense of the surface facing towards the user's head) with a more conventional "carbon look" and having an outer surface (in the sense of the surface facing away from the user's head) with a metallized "carbon look."

Because of its shape with variable thickness, the arm 1 has values of rigidity differentiated along its longitudinal extension, being more flexible and elastic in the second and third portions 2b and 2c and more rigid in the first portion 2a.

The arm 1 is produced by the following method.

A suitable number of layers of composite material, for example 3, in which the polymer material has not yet been cross-linked, are superimposed on one another so as to form the first plurality of layers 20. The separating element is placed on the final layer of the first plurality 20, forming the first layer 11, in the first portion (or first portions) 2a, and the second layer 12, followed by any further layers forming the second plurality of layers 21, for example another 2 layers, are then placed on top of the separating element.

The separating element interposed between the first and second layers 11 and 12 may be an insert 13 having a previously defined shape, or may comprise an expanding agent capable of moving the layers 11 and 12 away from one another during the molding phase which may or may not form the insert 13, as explained in detail in the preceding paragraphs.

The separating element is interposed between the first and the second layer 11 and 12 in the first portion 2a only, while the second layer 12 is in contact with the first layer 11 in the remaining regions, particularly in the second portion 2b, in the third portion 2c if present, and along the whole perimetric edge of the arm 1.

Preferably, the layers used for the pluralities of layers 20 and 21 have surface dimensions such that many arms can be produced, and therefore many separating elements are provided on the first layer 11, in predefined positions which are suitably spaced apart, each of these elements being provided in one or more corresponding first portions 2a of respective arms 1.

The intermediate product formed in this way is then subjected to a process of consolidation and cross-linking of the composite material forming the first and second plurality of layers 20 and 21, by being placed in a mold which is suitably heated to a predetermined temperature for a predefined time. By "predefined" or "predetermined" is meant defined or determined beforehand, so that the predefined or predetermined characteristic must be defined or determined, i.e., chosen or at least known, in advance of some event (such as before initiating the method steps).

Suitable impressions are formed in the mold, each having the final shape of the arm 1, so that the intermediate product, when properly centered in the mold, has each separating element in the correct position to produce arms 1 in which the layers 11 and 12 are spaced apart in the respective first portions 2a.

The mold is closed and subjected to a predefined pressure and temperature, according to the appropriate instructions for the type of composite material used.

In this phase, if the separating element comprises an expanding agent, the latter releases the gas which expands the pluralities of layers 20 and 21 against the opposed walls of the mold, with sufficient pressure to consolidate the layers of cross-linked polymer material in the desired shape, imparted by the impression of the mold suitably shaped in the form of the first portion 2a.

After a predetermined time, the mold is opened and the intermediate product is extracted.

In this phase, the intermediate product has a thin sheet-like shape, with the shapes of the arms 1 in relief, these arms then being cut away from the portion of intermediate product linking them to the other arms.

Advantageously, the edges of the impressions of the mold are made to be slightly rounded, so as to create a link between the edge of the relief defining the arm and the remaining sheet portion of the intermediate product.

The insert 13, if any, is also smaller than the impression of the mold, so that the first layer 11 and the second layer 12, as mentioned above, are directly in contact at the edges 7a and 7b. Thus the thickness of the edge portion that is to be trimmed is reduced, even in the first portion 2a. This enables the appearance of the composite material to be preserved, so that the texture of the weave (the "carbon look") can be appreciated even at the edges 7a and 7b of the arm 1, thus imparting a three-dimensional effect to the texture of the arm 1 and thereby enhancing the overall aesthetic value.

After being trimmed, the arm 1 is ground and painted by procedures which are conventional in this field.

Thus the present invention resolves the problem of the known references identified above, while also offering numerous other benefits, including the possibility of producing arms for spectacles of variable thickness by the superimposition of successive layers in the form of whole sheets of composite material, using established production processes which are relatively simple and inexpensive.

It also becomes possible to provide an arm of composite material with differentiated rigidity in which the thickness of the edge is kept low, in a way which is substantially independent of the thickness of the arm in its various regions.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also expressly intended that the steps of the methods of producing the various arms disclosed above are not restricted to any particular order.

The invention claimed is:

1. A method for making arms for spectacles from composite material with differentiated rigidity, each arm defining:
    a predominant longitudinal direction;
    at least a first portion of the arm;
    at least a second portion of the arm, adjacent to the first portion along the longitudinal direction and having lower flexural rigidity than the first portion; and
    at least a third portion of the arm adjacent to the first portion and placed on a side longitudinally opposed to the second portion, the third portion having lower flexural rigidity than the first portion,
the method comprising the steps of:
    providing at least a first layer of non-cross-linked fiber-reinforced polymer material, the at least one first layer extending along the predominant longitudinal direction at least at the first and second portions;
    providing a separating element at the first portion; and
    superimposing at least a second layer of non-cross-linked fiber-reinforced polymer material on the at least one first layer, the second layer extending along the predominant longitudinal direction so as to cover the separating element at the at least one first portion and so as to be in contact with the at least one first layer at the at least one second portion and the second layer is superimposed on the first layer so as to be in contact with the first layer at the third portion; and
    subjecting the at least one first layer, the at least one second layer and the separating element interposed between them to a molding process at predetermined pressure and temperature levels so as to cross-link the polymer of the composite material, thus obtaining a thickness and rigidity of the arm at the first portion which are greater than the thickness and rigidity of the arm at the second portion.

2. The method according to claim 1, wherein the at least one first layer and the at least one second layer extend along the whole longitudinal extension of the arm.

3. The method according to claim 1, wherein the at least one first layer and the at least one second layer and the separating element interposed between them are subjected to the molding process in a mold in which at least one recess, matching the final shape of the arm, is formed.

4. The method according to claim 1, wherein the at least one first layer is included in a first plurality of layers of fiber-reinforced polymer material superimposed on each other, all on the same side of the separating element.

5. The method according to claim 4, wherein the at least one second layer is included in a second plurality of layers of fiber-reinforced polymer material, all superimposed on each other on the same side of the separating element.

6. The method according to claim 5, wherein the first layer and the second layer are made with unidirectional reinforcing fibers, and the outermost layer of the first plurality of layers and/or of the second plurality of layers is made with metallized glass fibers or carbon fibers interwoven in textile form.

7. The method according to claim 1, wherein the second layer is in contact with the first layer along the whole edge of the arm.

8. The method according to claim 1, wherein the separating element comprises an insert completely covered by the at least one first layer and the at least one second layer.

9. The method according to claim 1, wherein the separating element comprises an expanding agent which can expand in the molding process to space the at least one second layer apart from the at least one first layer in the first portion.

10. The method according to claim 9, wherein the separating element is formed in the molding process by the expansion of the expanding agent.

11. The method according to claim 1, wherein the at least one first portion corresponds to a terminal region of the arm.

12. The method according to claim 1, wherein the at least one first portion corresponds, in use, to a median region of the arm adapted to face the temple of a user of the spectacles.

13. An arm for spectacles made of composite material with differentiated rigidity, on which are defined:
    a predominant longitudinal direction;
    at least a first portion of the arm; and
    at least a second portion of the arm, adjacent to the first portion along the longitudinal direction and having lower flexural rigidity than the first portion,
the arm comprising:
    at least a first layer of fiber-reinforced polymer material, extending along the predominant longitudinal direction at least at the first and second portions;
    at least a second layer of fiber-reinforced polymer material, extending along the predominant longitudinal direction and superimposed on the at least one first layer, so as to be in contact with the at least one first layer at the at least one second portion; and
    at least a third portion adjacent to the first portion and placed on a side longitudinally opposed to the second portion, the third portion having lower flexural rigidity than the first portion,
wherein, at the at least one first portion, the at least one first layer and the at least one second layer are spaced apart from each other so as to obtain a thickness and rigidity of the arm at the first portion which are greater than the thickness and rigidity of the arm at the second portion.

14. The arm according to claim 13, wherein the third portion has a rigidity and thickness substantially equal to those of the second portion.

15. The arm for spectacles according to claim 13, wherein, at the at least one first portion, an insert is interposed between the at least one first layer and the at least one second layer.

16. The arm for spectacles according to claim 15, wherein the insert has a thickness in the range from 0.2 to 4 mm.

17. The arm for spectacles according to claim 15, wherein the insert has a longitudinal dimension in the range from 15 to 40 mm.

18. The arm for spectacles according to claim 15, wherein the insert is shaped substantially in the form of a parallelepiped with a triangular section.

19. The arm for spectacles according to claim 15, wherein the insert comprises an expanded material.

20. The arm for spectacles according to claim 15, wherein the insert comprises one or more sealed bag-like envelopes containing gas.

21. The arm for spectacles according to claim 13, wherein the at least one second layer is in contact with the at least one first layer along the whole edge of the arm.

22. The arm for spectacles according to claim 13, wherein the fiber-reinforced polymer material of the first layer, of the second layer, or of both the first and the second layers comprises an epoxy-based matrix.

23. The arm for spectacles according to claim 13, wherein the composite material is reinforced with carbon fibers.

24. The arm for spectacles according to claim 13, wherein:
- an insert is interposed between the at least one first layer and the at least one second layer;
- the at least one first layer is included in a first plurality of layers of fiber-reinforced polymer material superimposed on each other, all on the same side of the insert,
- the at least one second layer is included in a second plurality of layers of fiber-reinforced polymer material, all superimposed on each other on the same side of the insert, and
- the first layer and the second layer are made with unidirectional reinforcing fibers, and the outermost layer of the first plurality of layers and/or of the second plurality of layers is made with metallized glass fibers or carbon fibers interwoven in textile form.

* * * * *